US011003189B2

(12) United States Patent
Refaat et al.

(10) Patent No.: US 11,003,189 B2
(45) Date of Patent: May 11, 2021

(54) TRAJECTORY REPRESENTATION IN BEHAVIOR PREDICTION SYSTEMS

(71) Applicant: Waymo LLC, Mountain View, CA (US)

(72) Inventors: Khaled Refaat, Mountain View, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/922,798

(22) Filed: Jul. 7, 2020

(65) Prior Publication Data

US 2020/0333794 A1 Oct. 22, 2020

Related U.S. Application Data

(63) Continuation of application No. 16/196,769, filed on Nov. 20, 2018, now Pat. No. 10,739,777.

(51) Int. Cl.
| | | |
|---|---|---|
| *G05D 1/02* | (2020.01) | |
| *G06N 20/00* | (2019.01) | |
| *G05D 1/00* | (2006.01) | |
| *G06N 5/04* | (2006.01) | |

(52) U.S. Cl.
CPC ......... *G05D 1/0221* (2013.01); *G05D 1/0088* (2013.01); *G06N 5/04* (2013.01); *G06N 20/00* (2019.01); *G05D 2201/0213* (2013.01)

(58) Field of Classification Search
None
See application file for complete search history.

(56) References Cited

U.S. PATENT DOCUMENTS

| | | |
|---|---|---|
| 8,706,298 B2 | 4/2014 | Goulding |
| 8,861,842 B2 | 10/2014 | Jung et al. |
| 9,092,985 B2 | 7/2015 | Richardson |
| 9,248,834 B1 | 2/2016 | Ferguson et al. |
| 10,059,334 B1 | 8/2018 | Zhu et al. |

(Continued)

OTHER PUBLICATIONS

Baumann et al., "Predicting Ego-Vehicle Paths from Environmental Observations with a Deep Neural Network," 2018 IEEE International Conference on Robotics and Automation (ICRA), May 2018, 4709-4716.

(Continued)

*Primary Examiner* — Shelley Chen
(74) *Attorney, Agent, or Firm* — Fish & Richardson P.C.

(57) ABSTRACT

Methods, systems, and apparatus, including computer programs encoded on a computer storage medium, for generating a representation of a trajectory of a target agent in an environment. In one aspect, the representation of the trajectory of the target agent in the environment is a concatenation of a plurality of channels, where each channel is represented as a two-dimensional array of data values. Each position in each channel corresponds to a respective spatial position in the environment, and corresponding positions in different channels correspond to the same spatial position in the environment. The channels include a time channel and a respective motion channel corresponding to each motion parameter in a predetermined set of motion parameters.

20 Claims, 5 Drawing Sheets

(56) References Cited

U.S. PATENT DOCUMENTS

| | | | |
|---|---|---|---|
| 2006/0165811 A1* | 7/2006 | Black | G06K 9/00536 424/570 |
| 2008/0161986 A1 | 7/2008 | Breed | |
| 2012/0070034 A1 | 3/2012 | Xiao et al. | |
| 2014/0140353 A1 | 5/2014 | Stahlin et al. | |
| 2014/0156806 A1* | 6/2014 | Karpistsenko | G06Q 50/28 709/219 |
| 2015/0286219 A1 | 10/2015 | Reichel et al. | |
| 2018/0046920 A1* | 2/2018 | Yang | G06Q 10/04 |
| 2018/0194349 A1 | 7/2018 | McGill, Jr. | |
| 2018/0299275 A1 | 10/2018 | Fong et al. | |

OTHER PUBLICATIONS

Deo et al., "Multi-Modal Trajectory Prediction of Surrounding Vehicles with Maneuver based LSTMs," https://arxiv.org/abs/1805.05499, May 2018, 6 pages.

Girshick. "Fast R-CNN," arXiv 1504.08083v2, Sep. 27, 2015, 9 pages.

Kim et al., "Probabilistic Vehicle Trajectory Prediction over Occupancy Grid Map via Recurrent Neural Network," https://arxiv.org/abs/1704.07049v1, Apr. 2017, 6 pages.

Leitner et al. "Learning Spatial Object Localization from Vision on a Humanoid Robot," International Journal of Advanced Robotic Systems, vol. 9, Dec. 2012, 10 pages.

Mehrasa et al. "Learning Person Trajectory Representations for Team Activity Analysis," arXiv 1706.00893v1, Jun. 3, 2017, 9 pages.

Nutzel, "AI-based movement planning for autonomous and teleoperated vehicles including the development of a simulation environment and an intelligent agent," retrieved from URL <https://mediatum.ub.tum.de/doc/1453739/file.pdf>, Jul. 2018, retrieved on Mar. 3, 2020, 120 pages.

PCT International Search Report and Written Opinion in International Appln. No. PCT/US2019/058836, dated Feb. 27, 2020, 12 pages.

PCT International Search Report and Written Opinion in International Appln. No. PCT/US2019/060187, dated Mar. 19, 2020, 16 pages.

PCT International Search Report and Written Opinion in International Appln. No. PCT/US2019/060886, dated Mar. 13, 2020, 11 pages.

Refaat et al., "Agent Prioritization for Autonomous Navigation," https://arxiv.org/abs/1909.08792, Sep. 2019, 8 pages.

Schwarting et al., "Planning and Decision-Making for Autonomous Vehicles," Annual Review of Control, Robotics, and Autonomous Systems, Jan. 2018,1:187-210.

Zhao et al. "A novel three-dimensional object detection with the modified you only look once method," International Journal of Advanced Robotic Systems, Mar. 2018, 13 pages.

\* cited by examiner

TRAJECTORY REPRESENTATION IN BEHAVIOR PREDICTION SYSTEMS

CROSS REFERENCE TO RELATED APPLICATION

This patent application is a continuation (and claims the benefit of priority under 35 USC 120) of U.S. patent application Ser. No. 16/196,769, filed Nov. 20, 2018. The disclosure of the prior application is considered part of (and is incorporated by reference in) the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on one or more computers in one or more locations that generates behavior prediction data.

According to a first aspect there is provided a method that includes obtaining historical data characterizing a trajectory of a target agent in an environment. The historical data includes, for each of multiple previous time points, data defining: (i) a spatial position in the environment occupied by the target agent at the previous time point, and (ii) respective values of each motion parameter in a predetermined set of motion parameters. The value of each motion parameter characterizes a respective feature of a motion of the target agent at the previous time point. A representation of the trajectory of the target agent in the environment is generated, where the representation of the trajectory of the target agent in the environment is a concatenation of multiple channels. Each channel is represented as a two-dimensional array of data values, and each position in each channel corresponds to a respective spatial position in the environment. Corresponding positions in different channels correspond to the same spatial position in the environment. The channels include a time channel and a respective motion channel corresponding to each motion parameter in the predetermined set of motion parameters.

For each particular spatial position in the environment occupied by the target agent at a particular previous time point, the position in the time channel which corresponds to the particular spatial position defines the particular previous time point. Moreover, for each motion channel, the position in the motion channel which corresponds to the particular spatial position defines the value of the motion parameter corresponding to the motion channel at the particular previous time point.

An input which includes the representation of the trajectory of the target agent in the environment is processed using a convolutional neural network to generate data characterizing a future trajectory of the target agent in the environment after a current time point.

In some implementations, the method includes obtaining the value of a velocity motion parameter which characterizes a velocity of the target agent at the previous time point. In some implementations, the method includes obtaining the value of an acceleration motion parameter which characterizes an acceleration of the target agent at the previous time point. In some implementations, the method includes obtaining the value of a heading motion parameter which characterizes a heading of the target agent at the previous time point.

In some implementations, the method includes processing the data characterizing the future trajectory of the target agent in the environment after the current time point using a planning system of a vehicle to generate a control output. The operations of the vehicle are autonomously modified based on the control output.

In some implementations, the method includes processing an input which includes the representation of the trajectory of the target agent in the environment to generate data defining, for each of a plurality of spatial locations in the environment, a respective probability that the target agent will occupy the spatial location at a specified time point after the current time point.

In some implementations, the method includes processing an input including data defining a candidate future trajectory of the target agent in the environment after the current time point in addition to the representation of the trajectory of the target agent in the environment to generate data defining a probability that the future trajectory of the target agent is the candidate future trajectory of the target agent.

In some implementations, the method includes generating data defining respective probabilities that the target agent will make each of a predetermined number of possible driving decisions.

In some implementations, the method includes generating a time channel and a respective motion channel corresponding to each motion parameter in the predetermined set of motion parameters which each represent a top-down perspective of the environment.

In some implementations, the method includes processing an input including one or more of: (i) a road-graph channel representing a known geometry of the environment, (ii) a target agent localization channel which represents a spatial position of the target agent in the environment at the current time point by a target agent bounding box, and (iii) an auxiliary localization channel which represents respective spatial positions of one or more other agents in the environment at the current time point by respective other agent bounding boxes.

In some implementations, the method includes generating a joint representation of trajectories of a plurality of other agents in the environment. An input which includes the joint representation of the trajectories of the plurality of other agents in the environment, in addition to the representation of the trajectory of the target agent in the environment, is processed using the convolutional neural network to generate data characterizing the future trajectory of the target agent in the environment after the current time point.

In some implementations, the joint representation of the trajectories of the plurality of other agents in the environment includes an auxiliary time channel and a respective auxiliary motion channel corresponding to each motion parameter in the predetermined set of motion parameters. Each channel is represented as a two-dimensional array of data values and each data value in each channel corresponds to a respective spatial position in the environment. For each particular spatial position in the environment occupied by a particular other agent at a particular previous time point: the data value in the auxiliary time channel which corresponds to the particular spatial position defines the particular previous time point; and for each auxiliary motion channel, the data value in the auxiliary motion channel which corresponds to the particular spatial position defines a value of the motion parameter corresponding to the auxiliary motion channel which characterizes a respective feature of a motion of the particular other agent at the particular previous time point.

According to a second aspect there is provided a system including a data processing apparatus and a memory in data communication with the data processing apparatus and storing instructions that cause the data processing apparatus to perform the operations of the previously described method.

According to a third aspect there are provided one or more non-transitory computer storage media storing instructions that when executed by one or more computers cause the one or more computers to perform operations comprising the operations of the previously described method.

Particular embodiments of the subject matter described in this specification can be implemented so as to realize one or more of the following advantages.

The on-board system described in this specification can accurately generate behavior prediction data characterizing future trajectories of target agents in the vicinity of a vehicle. Therefore, the on-board system described in this specification can be deployed in a vehicle to enable the vehicle to make fully-autonomous or partly-autonomous driving decisions, present information to the driver of the vehicle to assist the driver in operating the vehicle safely, or both.

The on-board system described in this specification uses a data representation system to generate trajectory representation data which defines the trajectory of a target agent and the trajectories of one or more other agents as a collection of two-dimensional (2D) "channels". The on-board system processes the trajectory representation data using a convolutional neural network to generate behavior prediction data for the target agent. The representation of the trajectories of the agents as a collection of 2D channels is more compact than a representation as a collection of 3D channels and, unlike a 1D representation, can be processed by multi-dimensional convolutional filters in the convolutional neural network. Therefore, the on-board system may consume fewer computational resources (e.g., memory, computing power, or both) by representing the trajectories of the agents as a collection of 2D channels than would be the case if the on-board system represented the trajectories of the agents as a collection of 3D channels. Moreover, the convolutional neural network can learn to exploit complex interactions between different spatial regions of the trajectory representation data by processing the collection of 2D channels representing the trajectories of the agents using multi-dimensional convolutional filters and thereby generate more accurate behavior prediction data.

The behavior prediction neural network described in this specification can be trained to generate behavior prediction data by directly processing data representing agent trajectories. In contrast, some conventional behavior prediction systems are configured to process large numbers of hand-crafted features which must be explicitly specified as inputs to the conventional system. The behavior prediction neural network described in this specification may generate more accurate behavior prediction data than these conventional systems and does not necessitate laborious hand-crafted feature engineering.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle can generate behavior prediction data that characterizes the future trajectory of a target agent in the vicinity of the vehicle. The target agent can be, for example, a pedestrian, a bicyclist, or another vehicle. To generate the behavior prediction data, the on-board system uses a data representation system to generate trajectory representation data which represents the trajectory of the target agent and the trajectories of the other agents in the vicinity of the vehicle as a collection of two-dimensional (2D) "channels". The on-board system processes the trajectory representation data using a convolutional neural network to generate behavior prediction data for the target agent. The behavior prediction data may, for example, define respective probabilities that the target agent makes each of a predetermined number of possible driving decisions (e.g., yielding, changing lanes, passing, braking, or accelerating).

The on-board system can use the behavior prediction data to perform actions which cause the vehicle to operate more safely. For example, the on-board system can generate fully-autonomous control outputs to apply the brakes of the vehicle to avoid a collision with a merging vehicle if the behavior prediction data suggests the merging vehicle is unlikely to yield. As another example, the on-board system can present an alert message to the driver of the vehicle with instructions to adjust the trajectory of the vehicle to avoid a collision with a merging vehicle if the behavior prediction data suggests the merging vehicle is unlikely to yield.

These features and other features are described in more detail below.

Figure 1:
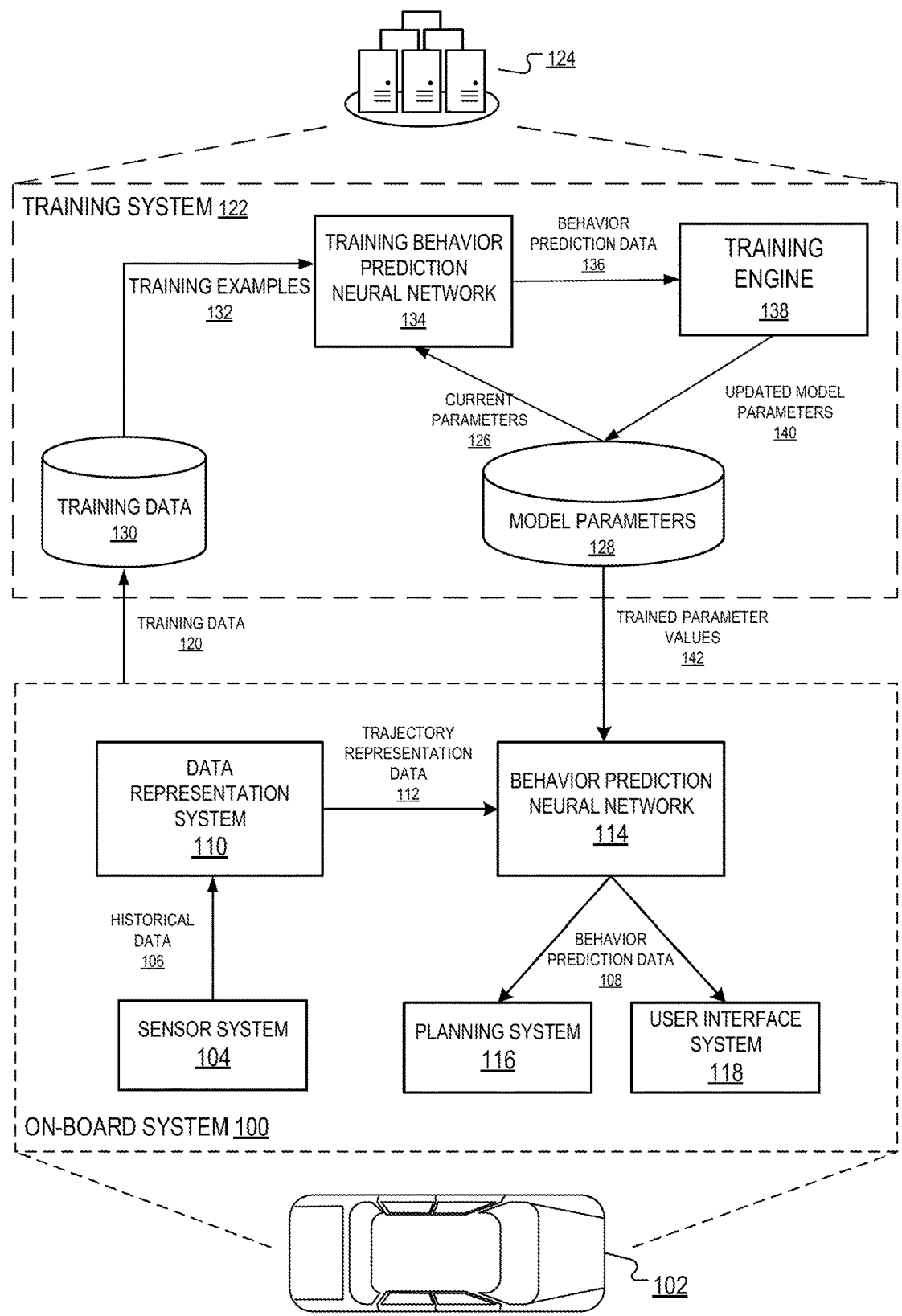
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can make fully-autonomous or partly-autonomous driving decisions (i.e., driving decisions taken independently of the driver of the vehicle 102), present information to the driver of the vehicle 102 to assist the driver in operating the vehicle safely, or both. For example, in response to determining that another vehicle is unlikely to yield for the vehicle 102, the on-board system 100 may autonomously apply the brakes of the vehicle 102 or otherwise autonomously change the trajectory of the vehicle 102 to prevent a collision between the vehicle 102 and the other vehicle. As another example, in response to determining that another vehicle is unlikely to yield for the vehicle 102, the on-board system 100 may present an alert message to the driver of the vehicle 102 with instructions to adjust the trajectory of the vehicle 102 to avoid a collision with the other vehicle.

Although the vehicle 102 in FIG. 1 is depicted as an automobile, and the examples in this document are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a sensor system 104 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 100 can use the sensor data continually generated by the sensor system 104 to track the trajectories of agents (e.g., pedestrians, bicyclists, other vehicles, and the like) in the environment in the vicinity of the vehicle 102. The trajectory of an agent refers to data defining, for each of multiple time points, the spatial position occupied by the agent in the environment at the time point and characteristics of the motion of the agent at the time point. The characteristics of the motion of an agent at a time point can include, for example, the velocity of the agent (e.g., measured in miles per hour—mph), the acceleration of the agent (e.g., measured in feet per second squared), and the heading of the agent (e.g., measured in degrees). The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

To track the trajectory of an agent in the environment in the vicinity of the vehicle 102, the on-board system 100 can maintain (e.g., in a physical data storage device) historical data 106 defining the trajectory of the agent up to the current time point. The on-board system 100 can use the sensor data continually generated by the sensor system 104 to continually update (e.g., every 0.1 seconds) the historical data 106 defining the trajectory of the agent. Generally, at a given time point, the historical data 106 includes data defining: (i) the respective trajectories of agents in the vicinity of the vehicle 102, and (ii) the trajectory of the vehicle 102 itself, up to the given time point.

The on-board system 100 can use the historical data 106 to generate, for one or more of the agents in the vicinity of the vehicle 102, respective behavior prediction data 108 which characterizes the future trajectory of the agent. In a particular example, the agent may be another vehicle which is attempting to merge onto a roadway being travelled by the vehicle 102, and the behavior prediction data 108 may define a probability that the other vehicle will yield to the vehicle 102. The on-board system 100 can continually generate behavior prediction data 108 for agents in the vicinity of the vehicle 102, for example, at regular intervals of time (e.g., every 0.1 seconds).

For convenience, the description which follows generally refers to the on-board system 100 generating behavior prediction data 108 which characterizes the future trajectory of a single target agent in the environment in the vicinity of the vehicle 102 at a current time point. More generally, the on-board system 100 can use the methods described in this specification to generate behavior prediction data 108 characterizing the future trajectories of any number of agents in the vicinity of the vehicle 102. For example, the on-board system 100 can use the methods described in this specification to generate behavior prediction data 108 for each of multiple agents that are determined to be high-priority agents (as previously described).

To generate behavior prediction data 108 for a target agent in the vicinity of the vehicle 102, the on-board system 100 processes the historical data 106 using a data representation system 110 to generate trajectory representation data 112. As will be described in more detail with reference to FIG. 2 and FIG. 3, the trajectory representation data 112 includes a representation of the trajectory of the target agent up to the current time point. Optionally, the trajectory representation data 112 can further include one or more of: (i) a joint representation of the trajectories of one or more other agents (potentially including the vehicle 102) up to the current time point, (ii) a representation of a candidate future trajectory of the target agent after the current time point, or (iii) a joint representation of predicted future trajectories of the one or more other agents after the current time point.

As will be described in more detail with reference to FIG. 4, the on-board system 100 processes the trajectory representation data 112 generated for the target agent using a behavior prediction neural network 114 to generate the behavior prediction data 108 characterizing the future trajectory of the target agent.

The on-board system 100 can provide the behavior prediction data 108 generated by the behavior prediction neural network 114 to a planning system 116, a user interface system 118, or both.

When the planning system 116 receives the behavior prediction data 108, the planning system 116 can use the behavior prediction data 108 to make fully-autonomous or partly-autonomous driving decisions. For example, the planning system 116 can generate a fully-autonomous plan to navigate the vehicle 102 to avoid a collision with another agent by changing the future trajectory of the vehicle 102 to avoid the agent. In a particular example, the on-board system 100 may provide the planning system 116 with behavior prediction data 108 indicating that another vehicle which is attempting to merge onto a roadway being travelled by the vehicle 102 is unlikely to yield to the vehicle 102. In this example, the planning system 116 can generate fully-autonomous control outputs to apply the brakes of the vehicle 102 to avoid a collision with the merging vehicle. The fully-autonomous or partly-autonomous driving decisions generated by the planning system 116 can be implemented by a control system of the vehicle 102. For example, in response to receiving a fully-autonomous driving decision generated by the planning system 116 which indicates that the brakes of the vehicle should be applied, the control system may transmit an electronic signal to a braking control unit of the vehicle. In response to receiving the electronic signal, the braking control unit can mechanically apply the brakes of the vehicle.

When the user interface system 118 receives the behavior prediction data 108, the user interface system 118 can use the behavior prediction data 108 to present information to the driver of the vehicle 102 to assist the driver in operating the vehicle 102 safely. The user interface system 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 100 may provide the user interface system 118 with behavior prediction data 108 indicating that another vehicle which is attempting to merge onto a roadway being travelled by the vehicle 102 is unlikely to yield to the vehicle 102. In this example, the user interface system 118 can present an alert message to the driver of the vehicle 102 with instructions to adjust the trajectory of the vehicle 102 to avoid a collision with the merging vehicle.

The on-board system 100 can generate training data 120 used by a training system 122 to determine trained parameter values of the behavior prediction neural network 114 from the trajectory representation data 112 which is continually generated by the on-board system 100. The on-board system 100 can provide the training data 120 to the training system 122 in offline batches or in an online fashion, for example, continually whenever it is generated.

The training system 122 is typically hosted within a data center 124, which can be a distributed computing system having hundreds or thousands of computers in one or more locations.

The training system 122 includes a training behavior prediction neural network 134 that is configured to generate behavior prediction data from input trajectory representation data. The training system 122 includes multiple computing devices having software or hardware modules that implement the respective operations of each layer of the training behavior prediction neural network 134 according to an architecture of the training behavior prediction neural network 134. The training behavior prediction neural network 134 generally has (at least partially) the same architecture as the on-board behavior prediction neural network 114.

The training behavior prediction neural network 134 can compute the operations of each layer of the training behavior prediction neural network 134 using current values of parameters 126 stored in a collection of model parameters 128. Although illustrated as being logically separated, the model parameters 128 and the software or hardware modules performing the operations may actually be located on the same computing device or on the same memory device.

The training data 130 includes multiple training examples 132. Each of the training examples 132 includes respective trajectory representation data for a target agent at a given time point, and optionally, trajectory representation data for one or more other agents at the given time point. Moreover, each training example 132 includes a label indicating behavior data characterizing the actual trajectory of the target agent after the given time point. For example, the label may indicate whether the target agent makes each of a predetermined number of possible driving decisions (e.g., yielding, changing lanes, passing, braking, or accelerating) after the given time point. The label may be generated by an automated (e.g., unsupervised) labeling procedure, by a manual labeling procedure (e.g., where a human rater performs the labeling), or some combination of the two. The training examples 132 in the training data 130 may be obtained from real or simulated driving data logs.

The training behavior prediction neural network 134 can process respective trajectory representation data from training examples 132 to generate, for each training example 132, respective behavior prediction data 136. A training engine 138 analyzes the behavior prediction data 136 and compares the behavior prediction data 136 to the labels in the training examples 132. More specifically, the training engine 138 computes a loss function that characterizes the difference between the generated behavior prediction data 136 and the labels in the training examples 132. The training engine 138 then generates updated model parameter values 140 by using an appropriate machine learning training technique (e.g., stochastic gradient descent). The training engine 138 can then update the collection of model parameters 128 using the updated model parameter values 140.

After training is complete, the training system 122 can provide a set of trained parameter values 142 to the on-board system 100 for use in making fully- or partly-autonomous driving decisions. The training system 122 can provide the set of trained parameter values 142 by a wired or wireless connection to the on-board system 100.

Figure 2:
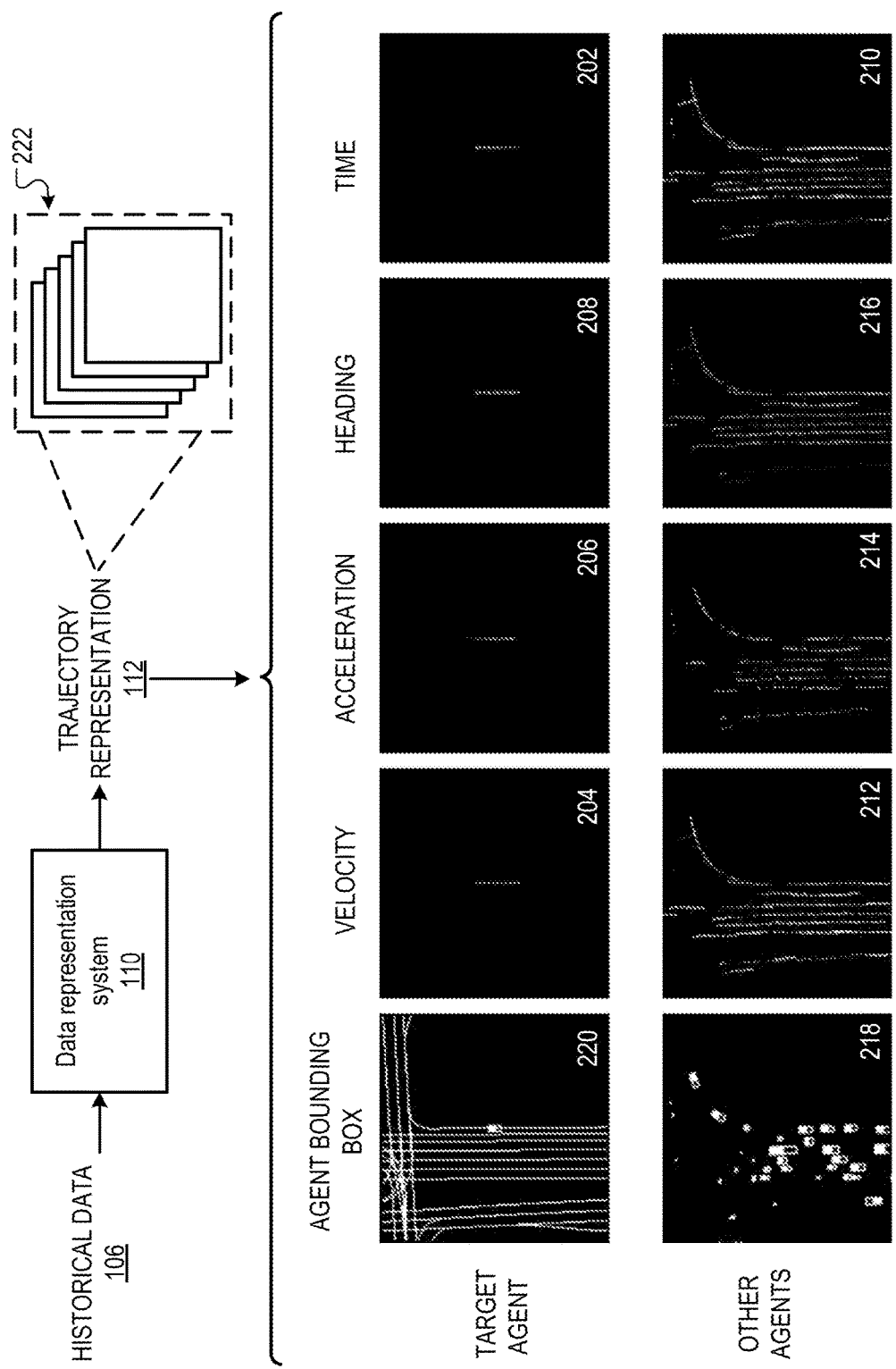
FIG. 2 is a block diagram of an example data representation system.

FIG. 2 is a block diagram of an example data representation system 110. The data representation system 110 is an example of a system implemented as computer programs on one or more computers in one or more locations in which the systems, components, and techniques described below are implemented.

The data representation system 110 processes the historical data 106 to generate the trajectory representation data 112. The trajectory representation data 112 is composed of multiple "channels". Each channel is a two-dimensional (2D) array of data values that represents a "top-down" perspective of the environment in the vicinity of the vehicle. Each position in each channel corresponds to a respective spatial position in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same spatial position in the environment. In other words, corresponding positions in different channels correspond to the same spatial position in the environment.

To represent the trajectory of the target agent, the trajectory representation data 112 includes a target agent time channel and respective target agent motion parameter channels corresponding to each of a predetermined number of motion parameters. Each of the motion parameters characterizes a respective characteristic of the motion of the agent, for example, the velocity, acceleration, or heading of the agent. As depicted in FIG. 2, the trajectory representation data 112 may include a target agent time channel 202, a target agent velocity channel 204, a target agent acceleration channel 206, and a target agent heading channel 208.

The target agent time channel and the target agent motion parameter channels represent the previous trajectory of the target agent up to the current time point, and optionally, a candidate future trajectory of the target agent after the current time point. A candidate future trajectory of the target agent refers to a possible trajectory of the target agent after the current time point. More specifically, a candidate future trajectory of the target agent specifies, for each of multiple future time points after the current time point, a spatial position in the environment that can be occupied by the agent at the future time point. For each of the multiple future time points, the candidate future trajectory further specifies possible values of each of the predetermined number of motion parameters that characterize the motion of the target agent at the future time point. The on-board system 100 can generate a candidate future trajectory of the target agent using any appropriate trajectory generation algorithm. For example, the on-board system 100 can generate a candidate future trajectory of the target agent by processing a road-graph which represents the geometry of the environment in the vicinity of the vehicle (e.g., the road, different lanes in the road, crosswalks, and the like). In a particular example, the on-board system 100 can process the road-graph to generate a candidate future trajectory of the target agent where the target agent maintains its current lane while slowing down for a Stop sign.

For brevity, the description which follows refers to the target agent time channel and the target agent motion parameter channels representing the previous trajectory of the target agent up to the current time point. It should be understood that the target agent time channel and the target agent motion parameter channels can similarly represent a candidate future trajectory of the target agent after the current time point in addition to the previous trajectory of the target agent up to the current time point.

The target agent time channel represents the respective time points at which the target agent occupies different spatial positions in the environment in the previous trajectory of the target agent. Each motion parameter channel represents the values of the respective motion parameter characterizing the motion of the target agent when the target agent occupies different spatial positions in the environment in the previous trajectory of the target agent. In particular, for each spatial position in the environment which is occupied by the target agent, the data value in the target agent time channel which corresponds to the spatial position defines the time point at which the target agent occupies the spatial position. Moreover, the data value in each respective target agent motion parameter channel which corresponds to the spatial position defines the value of the respective motion parameter characterizing the motion of the target agent when the target agent occupies the spatial position in the environment.

Generally, the environment may include multiple spatial positions which are not included in either the previous trajectory or the candidate future trajectory of the target agent. For these spatial positions, the data representation system 110 can set the data values in the target agent time channel and the target agent motion parameter channels which correspond to these spatial positions to a default value (e.g., the value 0).

When the same spatial position in the environment is occupied by the target agent at multiple time points, then the system 110 can set the respective data values in the target agent time channel and motion parameter channels which correspond to the spatial position to any appropriate values. For example, the system 110 can set the respective data values in the target agent time channel and motion parameter channels which correspond to the spatial position in accordance with the last time point when the target agent occupies the spatial position. That is, the system 110 can set the data value in the target agent time channel which corresponds to the spatial position to define the last time point when the target agent occupies the spatial position. Moreover, the system 110 can set the respective data values in the target agent motion parameter channels to define the values of the respective motion parameters characterizing the motion of the target agent when the target agent last occupies the spatial position.

To represent the trajectories of the "other agents" (i.e., agents other than the target agent, and potentially including the vehicle 102), the trajectory representation data optionally includes an auxiliary time channel and respective auxiliary motion parameter channels corresponding to each of the predetermined number of motion parameters. As depicted in FIG. 2, the trajectory representation data 112 may include an auxiliary time channel 210, an auxiliary velocity channel 212, an auxiliary acceleration channel 214, and an auxiliary heading channel 216.

The auxiliary time channel and the auxiliary motion parameter channels jointly represent the previous trajectories of the other agents up to the current time point, and optionally, predicted future trajectories of the other agents after the current time point. The system 110 may obtain the predicted future trajectories of the other agents as behavior prediction outputs of the behavior prediction neural network 114 from a previous time point. A predicted future trajectory of an agent specifies, for each of multiple future time points after the current time point, a spatial position in the environment that can be occupied by the agent at the future time point. For each of the multiple future time points, the predicted future trajectory further specifies possible values of each of the predetermined number of motion parameters that characterize the motion of the agent at the future time point.

For brevity, the description which follows refers to the auxiliary time channel and the auxiliary motion parameter channels representing the previous trajectories of the other agents up to the current time point. It should be understood that the auxiliary time channel and the auxiliary motion parameter channels can similarly represent predicted future trajectories of the other agents after the current time point in addition to the previous trajectories of the other agents up to the current time point.

The auxiliary time channel jointly represents the respective time points at which the other agents occupy different spatial positions in the environment in the previous trajectories of the other agents. Each auxiliary motion parameter channel represents the values of the respective motion parameters characterizing the motion of the other agents when the other agents occupy different spatial positions in the environment in the previous trajectories of the other agents. In particular, for each spatial position in the environment which is occupied by one of the other agents, the data value in the auxiliary time channel which corresponds to the spatial position defines the time point at which the other agent occupies the spatial position. Moreover, the data value in each respective auxiliary motion parameter channel which corresponds to the spatial position defines the value of the respective motion parameter characterizing the motion of the other agent when the other agent occupies the spatial position in the environment.

Generally, the environment may include multiple spatial positions which are not included in either the previous trajectory or the predicted future trajectory of any of the other agents. For these spatial positions, the data representation system 110 can set the data values in the auxiliary time channel and the auxiliary motion parameter channels which correspond to these spatial positions to a default value (e.g., the value 0).

When the same spatial position in the environment is occupied by other agents at multiple time points, then the system 110 can set the respective data values in the auxiliary time channel and auxiliary motion parameter channels which correspond to the spatial position to any appropriate values. For example, the system 110 can set the respective data values in the auxiliary time channel and auxiliary motion parameter channels which correspond to the spatial position in accordance with the last time point when one of the other agents occupies the spatial position.

By jointly representing the trajectories of the other agents using a single auxiliary time channel and a single auxiliary motion parameter corresponding to each motion parameter, the system 110 can generate trajectory representation data with a predetermined dimensionality irrespective of the (variable) number of other agents. In this manner, the trajectory representation data 112 generated by the system 110 can be readily processed by the behavior prediction neural network, which is configured to process trajectory representation data 112 of the predetermined dimensionality.

In some implementations, the system 110 can include further channels in the trajectory representation data 112 in addition to the time channels and motion parameter channels. For example, the system 110 can include one or more of: a road-graph channel, a target agent localization channel, and an auxiliary localization channel. A road-graph channel represents a known geometry of the environment in the vicinity of the vehicle 102. For example, the road-graph channel may represent the positions of different features of the environment, including: the road, different lanes in the road, crosswalks, traffic lights, construction zones, school zones, and the like. A target agent localization channel represents the spatial position of the target agent in the environment at the current time point (e.g., as defined by a bounding box). An auxiliary localization channel (e.g., the auxiliary localization channel 218) jointly represents the positions of each of the other agents in the environment at the current time point (e.g., as defined by bounding boxes). In the example depicted in FIG. 2, the road-graph channel and the target agent localization channel are superimposed onto a single channel 220.

The system 110 determines the trajectory representation data 112 by aligning and channel-wise concatenating the generated channels, as depicted by 222. That is, the trajectory representation data 112 is a concatenation of the generated channels. By implicitly representing the respective trajectories of the target agent and the other agents in this format, the system 110 generates a representation which is both compact and can be effectively processed by a convolutional behavior prediction neural network. In particular, the convolutional behavior prediction neural network can process the trajectory representation data using convolutional neural network layers defined by multi-dimensional (e.g., two- or three-dimensional) convolutional filters, thereby enabling the behavior prediction neural network to learn complex spatial relationships between different spatial regions of the environment.

Figure 3:
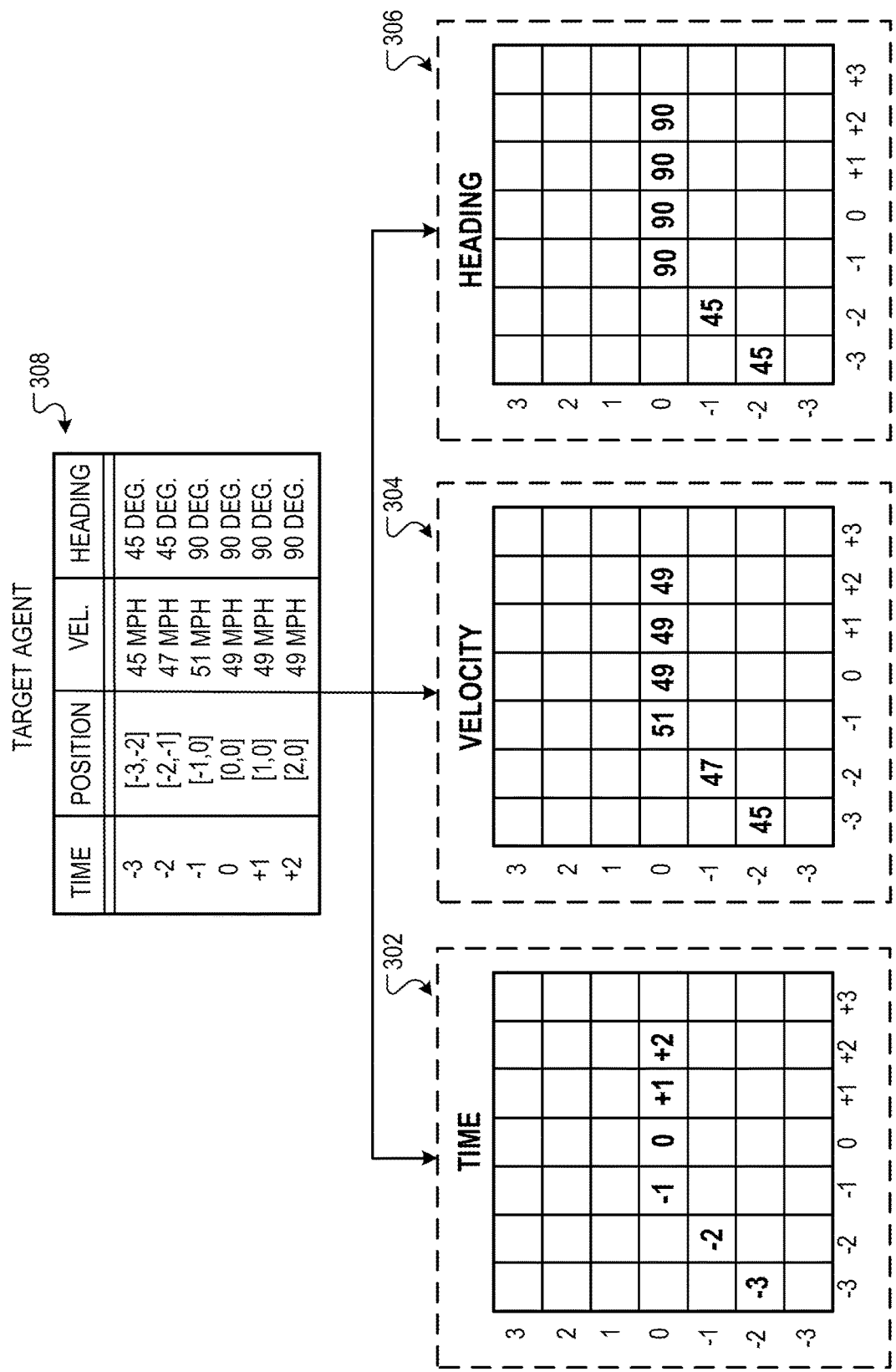
FIG. 3 is an illustration of an example process by which the data representation system can generate channels representing a previous trajectory of a target agent.

FIG. 3 is an illustration of an example process by which the data representation system 110 can generate a target agent time channel 302, a target agent velocity channel 304, and a target agent heading channel 306, which represent a previous trajectory of the target agent up to the current time point and a candidate future trajectory of the target agent after the current time point.

The data which defines the previous trajectory of the target agent (e.g., as obtained by the data representation system 110 from historical data 106) and the candidate future trajectory of the target agent is represented in a tabular format 308. Each row of the table defines a time point, a spatial position the target agent occupies in the environment at the time point, a velocity of the target agent at the time point, and a heading of the target agent at the time point.

The data representation system 110 sets the data values in the target agent time channel corresponding to spatial positions [−3, −2], [−2, −1], [−1, 0], [0, 0], [1, 0], and [2, 0] to the respective time points −3, −2, −1, 0, +1, and +2 at which the target agent occupies the respective spatial positions. For clarity, the data values in the target agent time channel corresponding to the other spatial positions are shown as blank. Generally, the data representation system 110 sets the data values in the target agent time channel corresponding to the other spatial positions to a default value (e.g., the value 0). Similarly, the data representation system 110 sets the data values in the target agent velocity channel corresponding to spatial positions [−3, −2], [−2, −1], [−1, 0], [0, 0], [1, 0], and [2, 0] to the respective velocity values 45, 47, 51, 49, 49, and 49 which define the velocity (in mph) of the target agent when the target agent occupies the respective spatial positions. Similarly, the data representation system 110 sets the data values in the target agent heading channel corresponding to spatial positions [−3, −2], [−2, −1], [−1, 0], [0, 0], [1, 0], and [2, 0] to the respective heading values 45, 45, 90, 90, 90, and 90 which define the heading (in degrees) of the target agent when the target agent occupies the respective spatial positions.

The data representation system 110 sets the data values in the target agent time channel corresponding to spatial positions [−3, −2], [−2, −1], [−1, 0], [0, 0], [1, 0], and [2, 0] to the respective time points −3, −2, −1, 0, +1, and +2 at which the target agent occupies the respective spatial positions. For clarity, the data values in the target agent time channel corresponding to the other spatial positions are shown as blank. Generally, the data representation system 110 sets the data values in the target agent time channel corresponding to the other spatial positions to a default value (e.g., the value 0). Similarly, the data representation system 110 sets the data values in the target agent velocity channel corresponding to spatial positions [−3, −2], [−2, −1], [−1, 0], [0, 0], [1, 0], and [2, 0] to the respective velocity values 45, 47, 51, 49, 49, and 49 which define the velocity (in mph) of the target agent when the target agent occupies the respective spatial positions. Similarly, the data representation system 110 sets the data values in the target agent heading channel corresponding to spatial positions [−3, −2], [−2, −1], [−1, 0], [0, 0], [1, 0], and [2, 0] to the respective heading values 45, 45, 90, 90, 90, and 90 which define the heading (in degrees) of the target agent when the target agent occupies the respective spatial positions.

In some implementations, the data representation system 110 determines the channel frame of reference to cause the spatial position occupied by the agent at the current time point to correspond to the data value in the "center" of each of the channels. Generating trajectory representation data with a consistent channel frame of reference can facilitate training of the behavior prediction neural network on the trajectory representation data.

Figure 4:
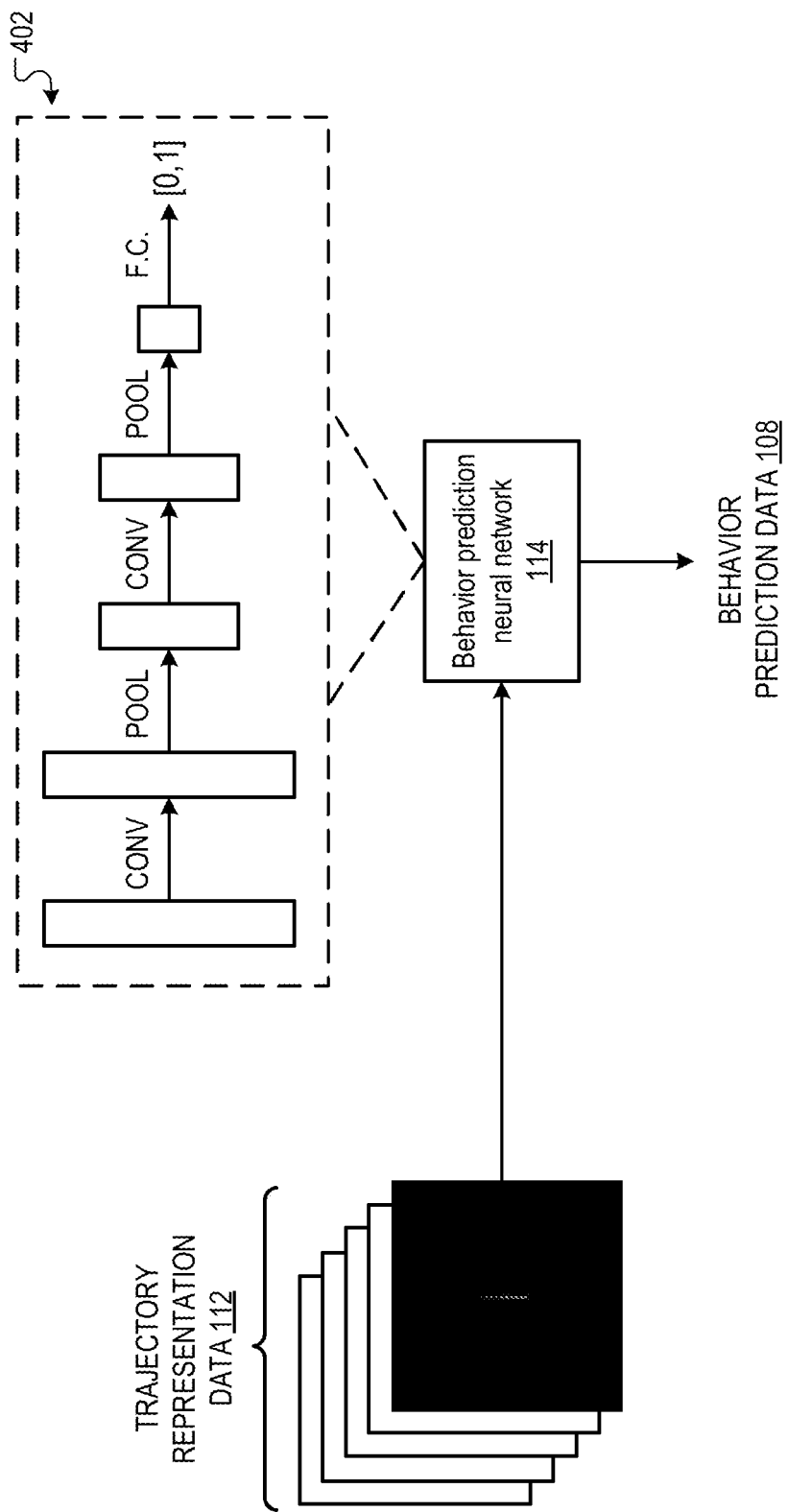
FIG. 4 is a block diagram of an example behavior prediction neural network.

FIG. 4 is a block diagram of an example behavior prediction neural network 114. The behavior prediction neural network 114 is an example of a system implemented as computer programs on one or more computers in one or more locations in which the systems, components, and techniques described below are implemented.

The behavior prediction neural network 114 is configured to process trajectory representation data 112 to generate behavior prediction data 108 which characterizes the future trajectory of the target agent after the current time point. The trajectory representation data 112 is generated by a data representation system 110, as described with reference to FIG. 2 and FIG. 3.

The network 114 is a convolutional neural network. That is, the architecture of the network 114 includes one or more convolutional neural network layers. Each of the convolutional neural network layers are defined by respective parameter values of a set of convolutional filters. A convolutional neural network layer is configured to process a convolutional neural network layer input to generate a convolutional neural network layer output that includes one or more feature maps. Each of the feature maps corresponds to a respective convolutional filter of the layer, and is generated by convolving the convolutional filter with the layer input and, optionally, applying an activation function to the result of the convolution. Since the trajectory representation data 112 is represented as a channel-wise concatenation of multiple 2D channels, the convolutional filters of the convolutional layers of the network 114 are generally multi-dimensional (e.g., 2D or 3D).

In some implementations, the behavior prediction data 108 defines, for each of multiple spatial locations in the environment, a respective probability that the target agent will occupy the spatial location at a specified time point after the current time point. In these implementations, the output layer of the network 114 may be a sigmoid layer with a respective neuron corresponding to each of the spatial locations in the environment. The probability that the target agent will occupy a particular spatial location at the specified time point after the current time point may be defined as the activation of the neuron in the sigmoid output layer that corresponds to the particular spatial location.

In some implementations, the behavior prediction data 108 defines a probability that a candidate future trajectory of the target agent represented by the trajectory representation data 112 (as described with reference to FIG. 2) is the actual future trajectory of the target agent. In these implementations, the output layer of the network 114 may include a single neuron, where the activation of the neuron is defined as the output of an activation function with an output range of [0, 1] (e.g., a sigmoid activation function). The probability that the candidate future trajectory of the target agent represented by the trajectory representation data 112 is the actual future trajectory of the target agent may be defined as the activation of the single neuron in the output layer.

In some implementations, the behavior prediction data 108 defines a respective probability that the target agent will make each of a predetermined number of possible driving decisions. For example, the possible driving decisions may include one or more of: yielding, changing lanes, passing, braking, and accelerating. In these implementations, the output layer of the network 114 may be a sigmoid layer with a respective neuron corresponding to each of the possible driving decisions. The probability that the target agent will make a particular driving decision after the current time point may be defined as the activation of the neuron in the sigmoid output layer that corresponds to the particular driving decision.

An example architecture 402 of the network 114 is depicted in FIG. 4. In this example architecture, the trajectory representation data 112 is processed by a first convolutional layer, a first pooling layer, a second convolutional layer, a second pooling layer, and a fully-connected layer with a single neuron. The pooling layers may be, for example, max-pooling layers or average-pooling layers.

Figure 5:
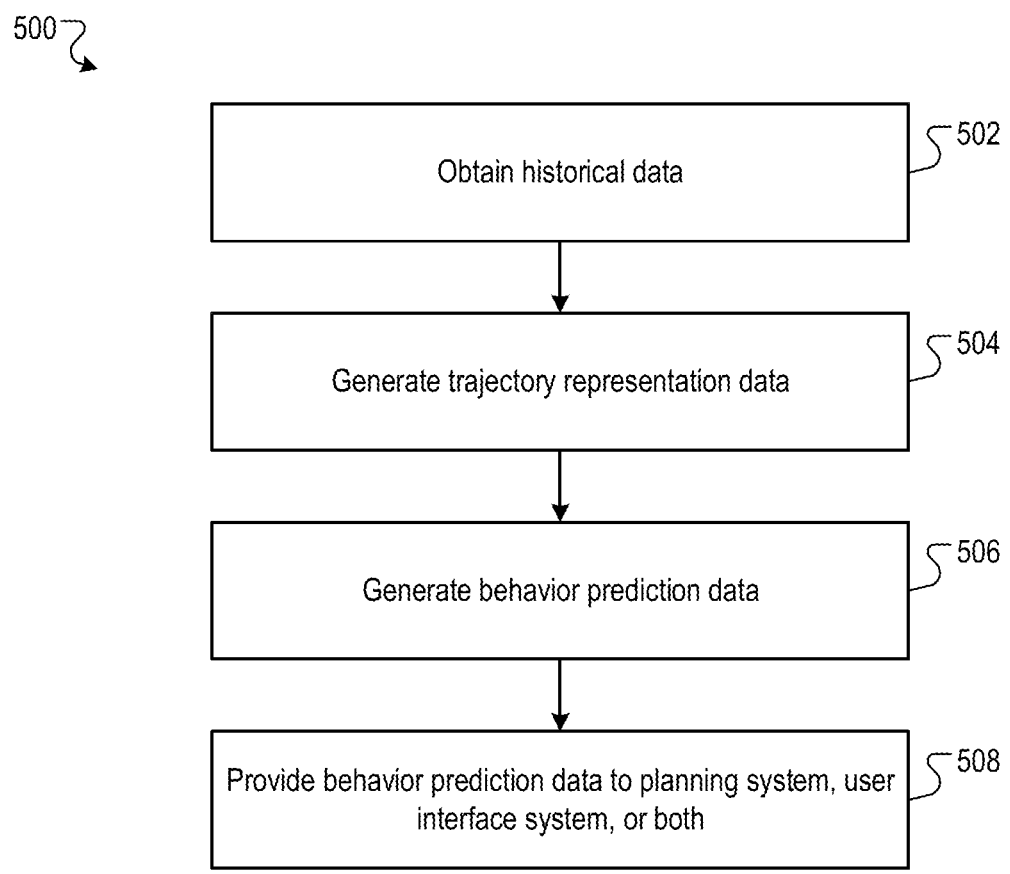
FIG. 5 is a flow diagram of an example process for generating behavior prediction data.

FIG. 5 is a flow diagram of an example process 500 for generating behavior prediction data. For convenience, the process 500 will be described as being performed by a system of one or more computers located in one or more locations. For example, an on-board system, e.g., the on-board system 100 of FIG. 1, appropriately programmed in accordance with this specification, can perform the process 500.

The system obtains historical data characterizing the previous trajectory of the target agent, and optionally, the respective previous trajectories of one or more other agents (502). Historical data characterizing the trajectory of an agent includes, for each of multiple time points, data defining a spatial position in the environment occupied by the agent at the time point. For each time point, the historical data further defines respective values of each motion parameter in a predetermined set of motion parameters. The value of each motion parameter characterizes a respective feature of the motion of the agent at the time point. Examples of motion parameters include: velocity, acceleration, and heading. In some implementations, the system further obtains data characterizing a candidate future trajectory of the target agent, and predicted future trajectories of the one or more other agents. The predicted future trajectories of the other agents may be defined by behavior prediction outputs which were previously generated by the system for the other agents.

The system processes the historical data to generate trajectory representation data (504). The trajectory representation data is a channel-wise concatenation of multiple 2D channels that each represent a top-down perspective of the environment in the vicinity of the vehicle. The channels include a target agent time channel and respective target agent motion parameter channels that define the previous trajectory of the target agent, and optionally, a candidate future trajectory of the target agent. The channels further include an auxiliary time channel and respective auxiliary motion parameter channels that jointly represent the previous trajectories of the other agents, and optionally, predicted future trajectories of the other agents. In some implementations, the trajectory representation data includes additional channels, such as a road-graph channel, a target agent localization channel, and an auxiliary localization channel (as described with reference to FIG. 2).

The system processes the trajectory representation data using a behavior prediction neural network to generate behavior prediction data which characterizes a future trajectory of the target agent after the current time point (506). In some implementations, the behavior prediction data defines, for each of multiple spatial locations in the environment, a respective probability that the target agent will occupy the spatial location at a time point after the current time point. In some implementations, the behavior prediction data defines a probability that a candidate future trajectory of the target agent represented by the trajectory representation data is the actual future trajectory of the target agent. In some implementations, the behavior prediction data defines a respective probability that the target agent will make each of a predetermined number of possible driving decisions.

The system provides the behavior prediction data to a planning system, a user interface system, or both (508). When the planning system receives the behavior prediction data, the planning system can use the behavior prediction data to make fully-autonomous or partly-autonomous driving decisions. When the user interface system receives the behavior prediction data, the user interface system can use the behavior prediction data to present information to the driver of the vehicle to assist the driver in operating the vehicle safely. The fully-autonomous or partly-autonomous driving decisions generated by the planning system can be implemented by a control system of the vehicle. For example, in response to receiving a fully-autonomous driving decision generated by the planning system which indicates that the brakes of the vehicle should be applied, the control system may transmit an electronic signal to a braking control unit of the vehicle. In response to receiving the electronic signal, the braking control unit can mechanically apply the brakes of the vehicle.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    obtaining historical data characterizing a trajectory of a target agent in an environment, the historical data comprising, for each of a plurality of previous time points, data defining a spatial position in the environment occupied by the target agent at the previous time point;
    generating a representation of the trajectory of the target agent in the environment, wherein:
        the representation of the trajectory of the target agent in the environment comprises a time channel;
        the time channel is represented as a two-dimensional array of data values;
        each position in the time channel corresponds to a respective spatial position in the environment; and
        for each particular spatial position in the environment occupied by the target agent at a particular previous time point:
            the position in the time channel which corresponds to the particular spatial position defines the particular previous time point; and
    processing an input which comprises the representation of the trajectory of the target agent in the environment using a convolutional neural network to generate data characterizing a future trajectory of the target agent in the environment after a current time point.

2. The method of claim 1, wherein the historical data further comprises, for each of the plurality of previous time points, respective values of each motion parameter in a predetermined set of motion parameters, wherein the value of each motion parameter characterizes a respective feature of a motion of the target agent at the previous time point.

3. The method of claim 2, wherein:
    the representation of the trajectory of the target agent in the environment comprises a concatenation of a plurality of channels, including: (i) the time channel, and (ii) a respective motion channel corresponding to each motion parameter in the predetermined set of motion parameters;
    each motion channel is represented as a two-dimensional array of data values;
    each position in each motion channel corresponds to a respective spatial position in the environment; and
    corresponding positions in different channels of the plurality of channels correspond to the same spatial position in the environment.

4. The method of claim 3, wherein for each particular spatial position in the environment occupied by the target agent at a particular previous time point:
for each motion channel, the position in the motion channel which corresponds to the particular spatial position defines the value of the motion parameter corresponding to the motion channel at the particular previous time point.

5. The method of claim 4, wherein the set of motion parameters comprises:
a velocity motion parameter that characterizes a velocity of the target agent in the environment;
an acceleration motion parameter that characterizes an acceleration of the target agent in the environment; and
a heading motion parameter that characterizes a heading of the target agent in the environment.

6. The method of claim 1, further comprising:
processing the data characterizing the future trajectory of the target agent in the environment after the current time point using a planning system of a vehicle to generate a control output; and
autonomously modifying operations of the vehicle based on the control output.

7. The method of claim 1, wherein processing an input which comprises the representation of the trajectory of the target agent in the environment using a convolutional neural network to generate data characterizing a future trajectory of the target agent in the environment after the current time point comprises:
processing an input which comprises the representation of the trajectory of the target agent in the environment to generate data defining, for each of a plurality of spatial locations in the environment, a respective probability that the target agent will occupy the spatial location at a specified time point after the current time point.

8. The method of claim 1, wherein processing an input which comprises the representation of the trajectory of the target agent in the environment using a convolutional neural network to generate data characterizing a future trajectory of the target agent in the environment after the current time point comprises:
processing an input comprising data defining a candidate future trajectory of the target agent in the environment after the current time point in addition to the representation of the trajectory of the target agent in the environment to generate data defining a probability that the future trajectory of the target agent is the candidate future trajectory of the target agent.

9. The method of claim 1, wherein processing an input which comprises the representation of the trajectory of the target agent in the environment using a convolutional neural network to generate data characterizing a future trajectory of the target agent in the environment after the current time point comprises:
generating data defining respective probabilities that the target agent will make each of a predetermined number of possible driving decisions.

10. The method of claim 1, wherein the time channel represents a top-down perspective of the environment.

11. The method of claim 1, wherein processing an input which comprises the representation of the trajectory of the target agent in the environment using a convolutional neural network comprises:
processing an input comprising one or more of: (i) a road-graph channel representing a known geometry of the environment, (ii) a target agent localization channel which represents a spatial position of the target agent in the environment at the current time point by a target agent bounding box, and (iii) an auxiliary localization channel which represents respective spatial positions of one or more other agents in the environment at the current time point by respective other agent bounding boxes.

12. The method of claim 2, further comprising:
generating a joint representation of trajectories of a plurality of other agents in the environment; and
processing an input which comprises the joint representation of the trajectories of the plurality of other agents in the environment, in addition to the representation of the trajectory of the target agent in the environment, using the convolutional neural network to generate data characterizing the future trajectory of the target agent in the environment after the current time point.

13. The method of claim 12, wherein:
the joint representation of the trajectories of the plurality of other agents in the environment comprises an auxiliary time channel and a respective auxiliary motion channel corresponding to each motion parameter in the predetermined set of motion parameters;
each channel is represented as a two-dimensional array of data values and each data value in each channel corresponds to a respective spatial position in the environment; and
for each particular spatial position in the environment occupied by a particular other agent of the plurality of other agents at a particular previous time point:
the data value in the auxiliary time channel which corresponds to the particular spatial position defines the particular previous time point; and
for each auxiliary motion channel, the data value in the auxiliary motion channel which corresponds to the particular spatial position defines a value of the motion parameter corresponding to the auxiliary motion channel which characterizes a respective feature of a motion of the particular other agent at the particular previous time point.

14. The method of claim 12, wherein:
the joint representation of the trajectories of the plurality of other agents in the environment comprises an auxiliary time channel and a respective auxiliary motion channel corresponding to each motion parameter in the predetermined set of motion parameters;
each channel is represented as a two-dimensional array of data values and each data value in each channel corresponds to a respective spatial position in the environment; and
for each particular spatial position in the environment occupied by a particular other agent of the plurality of other agents at a particular future time point:
the data value in the auxiliary time channel which corresponds to the particular spatial position defines the particular future time point; and
for each auxiliary motion channel, the data value in the auxiliary motion channel which corresponds to the particular spatial position defines a predicted value of the motion parameter corresponding to the auxiliary motion channel which characterizes a respective feature of a motion of the particular other agent at the particular future time point.

15. A system comprising:
one or more computers; and
one or more storage devices communicatively coupled to the one or more computers, wherein the one or more storage devices store instructions that, when executed by the one or more computers, cause the one or more computers to perform operations comprising:

obtaining historical data characterizing a trajectory of a target agent in an environment, the historical data comprising, for each of a plurality of previous time points, data defining a spatial position in the environment occupied by the target agent at the previous time point;

generating a representation of the trajectory of the target agent in the environment, wherein:
- the representation of the trajectory of the target agent in the environment comprises a time channel;
- the time channel is represented as a two-dimensional array of data values;
- each position in the time channel corresponds to a respective spatial position in the environment; and
- for each particular spatial position in the environment occupied by the target agent at a particular previous time point:
  - the position in the time channel which corresponds to the particular spatial position defines the particular previous time point; and processing an input which comprises the representation of the trajectory of the target agent in the environment using a convolutional neural network to generate data characterizing a future trajectory of the target agent in the environment after a current time point.

16. The system of claim 15, wherein the historical data further comprises, for each of the plurality of previous time points, respective values of each motion parameter in a predetermined set of motion parameters, wherein the value of each motion parameter characterizes a respective feature of a motion of the target agent at the previous time point.

17. The system of claim 16, wherein:
the representation of the trajectory of the target agent in the environment comprises a concatenation of a plurality of channels, including: (i) the time channel, and (ii) a respective motion channel corresponding to each motion parameter in the predetermined set of motion parameters;
each motion channel is represented as a two-dimensional array of data values;
each position in each motion channel corresponds to a respective spatial position in the environment; and
corresponding positions in different channels of the plurality of channels correspond to the same spatial position in the environment.

18. The system of claim 17, wherein for each particular spatial position in the environment occupied by the target agent at a particular previous time point:
for each motion channel, the position in the motion channel which corresponds to the particular spatial position defines the value of the motion parameter corresponding to the motion channel at the particular previous time point.

19. The system of claim 18, wherein the set of motion parameters comprises:
a velocity motion parameter that characterizes a velocity of the target agent in the environment;
an acceleration motion parameter that characterizes an acceleration of the target agent in the environment; and
a heading motion parameter that characterizes a heading of the target agent in the environment.

20. One or more non-transitory computer storage media storing instructions that when executed by one or more computers cause the one or more computers to perform operations comprising:

obtaining historical data characterizing a trajectory of a target agent in an environment, the historical data comprising, for each of a plurality of previous time points, data defining a spatial position in the environment occupied by the target agent at the previous time point;

generating a representation of the trajectory of the target agent in the environment, wherein:
- the representation of the trajectory of the target agent in the environment comprises a time channel;
- the time channel is represented as a two-dimensional array of data values;
- each position in the time channel corresponds to a respective spatial position in the environment; and
- for each particular spatial position in the environment occupied by the target agent at a particular previous time point:
  - the position in the time channel which corresponds to the particular spatial position defines the particular previous time point; and processing an input which comprises the representation of the trajectory of the target agent in the environment using a convolutional neural network to generate data characterizing a future trajectory of the target agent in the environment after a current time point.

* * * * *